(12) United States Patent
Leiggi

(10) Patent No.: US 6,439,492 B1
(45) Date of Patent: Aug. 27, 2002

(54) VEHICULAR FLUID ABSORBENT PAD

(76) Inventor: David Leiggi, 95-270 Waikalani Dr., apt. F-303, Mililani, HI (US) 96789

( * ) Notice: Subject to any disclaimer, the term of this patent is extended or adjusted under 35 U.S.C. 154(b) by 16 days.

(21) Appl. No.: 09/704,942

(22) Filed: Nov. 2, 2000

(51) Int. Cl.[7] .............................................. B65H 75/48
(52) U.S. Cl. ...................... 242/379; 242/385.1; 210/924
(58) Field of Search ................................ 242/379, 371, 242/376, 377, 385, 385.1; 210/924; 428/68, 77, 76, 189; 15/215

(56) References Cited

U.S. PATENT DOCUMENTS

| | | | | |
|---|---|---|---|---|
| 2,031,459 A | * | 2/1936 | Chambless | 156/36 |
| 3,141,522 A | * | 7/1964 | Fitzpatrick | 184/106 |
| 4,497,147 A | | 2/1985 | Clapper et al. | |
| 4,671,024 A | | 6/1987 | Schumacher | |
| 4,684,562 A | * | 8/1987 | Hartkeymer | 428/182 |
| 4,798,754 A | | 1/1989 | Tomek | |
| 4,801,005 A | * | 1/1989 | Hahn et al. | 141/98 |
| 5,011,007 A | | 4/1991 | Kenimer | |
| 5,020,638 A | * | 6/1991 | Smith | 184/106 |
| 5,080,956 A | | 1/1992 | Smith | |
| 5,114,774 A | | 5/1992 | Maxim, Jr. | |
| 5,419,945 A | * | 5/1995 | Lopez | 428/178 |
| 5,549,945 A | | 8/1996 | Lind | |
| 5,834,104 A | * | 11/1998 | Cordani | 428/218 |
| 5,916,658 A | | 6/1999 | Mohr | |
| 5,957,241 A | | 9/1999 | Anderson | |
| 6,062,162 A | | 5/2000 | Dean | |

* cited by examiner

Primary Examiner—Donald P. Walsh
Assistant Examiner—Mark J. Beauchaine
(74) Attorney, Agent, or Firm—Michael I. Kroll

(57) ABSTRACT

The present invention 10 discloses an absorption means of liquid spills and fluids that may leak or fall from underneath the chassis of a motor vehicle 12. The present invention 10 discloses a main enclosure 16 being a cylindrical-shaped structure having a thin, rectangular aperture 22 therein through which an absorbing element 14 passes. On each end of the main enclosure are retaining cap ends 28 which have retaining grooves 53 therein which provide coupling means for the present invention 10. The counterweight element 36 is provided in the base of the main enclosure 16 for providing anchorage and stability to the present invention. Rubber feet having threaded members 48 are provided which pass through threaded apertures 50 of the counterweight 36 and provide means for connecting the end caps 28, counterweights 36 and rubber feet 30 together The absorbing member 14 is a rectangular-shaped structure comprising a porous material layer 58, an absorbing material layer 60 and an impermeable material layer 62. A barrel element or take-up barrel 44 is provided upon which the absorbing element 14 is wound. The barrel element is provided with a spring-loaded ratchet mechanism 46 which provides means for retracting and extending the take-up barrel. A stop 24 having a ring-shaped handle 26 thereon is provided on the distal end of the absorbing element 14 which is used to prevent the absorbing element from being inadvertently retracted into the interior of the main enclosure 16.

19 Claims, 9 Drawing Sheets

VEHICULAR FLUID ABSORBENT PAD

BACKGROUND OF THE INVENTION

1. Field of the Invention

The present invention relates generally to vehicular fluids containment devices and, more specifically, to the absorption of vehicular fluids that may precipitate from the under chassis of a motor vehicle. The present invention is a vehicular fluid absorbing pad with selectively retractable and extendable means. The vehicular fluid absorbing pad consists of a main enclosure, two retaining end caps having retaining brackets and channeled grooves therein, a guide baffle, an absorbing element, a spring loaded ratchet mechanism, a barrel element, a counter weight and a stopper. The main enclosure is a modified cylindrical shaped structure having a thin rectangular aperture therein. The main enclosure provides am the housing for the guide baffle, the absorbing element, the barrel, the counter weight, and the spring loaded ratchet mechanism. Also the main enclosure provides the means for protection for the internal intricate components from the harsh conditions of the surrounding environment. The retaining end caps are cup shaped structures having retaining grooves therein. The retaining end caps provide the means for retaining the internal intricate components in the main enclosure of the vehicular fluid absorbent pad. The retaining end caps are furnished with a plurality of grooved channels which provide the means for coupling the retaining end caps with several of the intricate components of the vehicular fluid absorbent pad. The retaining end caps are also furnished with a retaining bracket which provides the means for coupling the retaining end caps with the ratchet of the spring loaded ratchet mechanism. Also the retaining end caps assists in providing the absorbing element of the retractable fluid absorbent pad with it selectively retracting and extending abilities by working in conjunction with the ratchet member of the spring loaded ratchet mechanism. The retaining end caps are furthermore furnished with threaded circle shaped apertures at its base to provide the means for the coupling of the retaining end caps with the counter weight element via the threaded member of the rubber feet. The counter weight element is a rectangular shaped weighted structure. The counter weight element provides the vehicular fluid absorbent pad with the means of anchorage and stability. The counter weight element is located in the main enclosure at the base of the main enclosure. The counter weight element is furnished with threaded apertures at each of its distal ends to provide the means for coupling the retaining end caps with the counter weight element of the vehicular fluid absorbent pad by working in conjunction with the a threaded member of the rubber feet. The absorbing member is a rectangular shaped structure comprised of a porous sponge like material. The absorbing member provides the vehicular fluid absorbent pad with the means for the absorption of hazardous and other fluids that precipitate from a vehicle's under carriage or chassis. The absorbing element is coupled to the barrel element at one of its distal ends. Also the absorbing element is rolled and housed on the barrel element. The absorbing pad is coupled to the stopper at its opposite distal end. The absorbing pad with stopper coupled thereto, protrudes through the thin rectangular shaped aperture of the main enclosure. The barrel element provides housing for the absorbing pad of said vehicular fluid absorbent pad. Also the barrel element is coupled to the spring loaded ratchet mechanism and works in conjunction with the spring loaded ratchet mechanism as they provide the means for extending and retracting the absorbing pad of said vehicular fluid absorbent pad. The spring loaded ratchet mechanism provides the retracting and extending means for the absorbing pad as it works in conjunction with the retaining end caps retaining bracket as well as the barrel element. The spring loaded ratchet mechanism is activated when the absorbing element is pulled on to be extended or pulled on to initiate the ratchet mechanisms retractable ability. The spring loaded ratchet mechanism resembles the spring loaded ratchet mechanisms that are commonly found in conventional window shades. The rubber feet having threaded extended members provide the vehicular fluid absorbent pad with traction and stability. The rubber feet are positioned one in each of the four threaded apertures located at each distal corners of the base of the vehicular fluid absorbent pad retaining end caps. The stopper is a cylindrical shaped structure that is coupled to the other distal end of the absorbing element. The stopper provides the means for preventing the absorbing pad from inadvertently being retracted into the main enclosure. The stopper also has a ringed-shaped structure thereon to provide the means for attaching the absorbing element to a stationary position when extended from the main enclosure of the vehicular fluid absorbent pad. The vehicular fluid absorbent pad may be placed under a vehicle suspected of leaking vehicular fluids, or it may be placed beneath a vehicle under going selective vehicular tune-ups and fluid changes. The vehicular fluid absorbent pad provides the individual user with catching and retaining sump like characteristics and may also provide the means of a last resort for protecting road side and parking areas from being damaged from inadvertent vehicular fluid leaks. The vehicular fluid absorbent pad when fully extended is designed to span the entire under chassis of a vehicle to insure that all areas that may fall suspect to vehicular fluid leakage are covered.

2. Description of the Prior Art

There are other fluid absorbing and retaining devices designed for absorbing, catching and retaining fluids. Typical of these is U.S. Pat. No. 4,497,147 issued to Clapper et al on Feb. 5, 1985.

Another patent was issued to Schumacher on Jun. 9, 1987 as U.S. Pat. No. 4,671,024. Yet another U.S. Pat. No. 4,798,754 was issued to Tomek on Jan. 17, 1989 and still yet another was issued on Apr. 30, 1991 to Kenimer as U.S. Pat. No. 5,011,007.

Another patent was issued to Smith on Jan. 14, 1992 as U.S. Pat. No. 5,080,956. Yet another U.S. Pat. No. 5,114,774 was issued to Maxim, Jr. on May 19, 1992. Another was issued to Lind on Aug. 27, 1996 as U.S. Pat. No. 5,549,945 and still yet another was issued on Jun. 29, 1999 to Mohr as U.S. Pat. No. 5,916,658. Yet another U.S. Pat. No. 5,957,241 was issued to Anderson on Sept. 28, 1999. Another patent was issued to Dean on May 16, 2000 as U.S. Pat. No. 6,062,162.

U.S. Pat. No. 4,497,147

Inventor: David D. Clapper

Issued: Feb. 5, 1985

Drips-catching mats for installation in combination with a minor proportion of a floor especially a garage floor beneath a motor vehicle to capture oil drippings therefrom. The mat essentially comprises generally horizontally extending laminar elements including: a base member highly-tenaciously bonded to the underlying floor environment; an oleophilic blotter member having a lower-tenacity attached to the base member whereby an oleo-laden blotter can be manually replaced with a fresh blotter without disrupting the high-tenacity flooring bond to the base member, the lower-tenacity attachment preferably comprising an oleo-resistant laminar adhesive; and visual indicator means to indicate when blotter replacement is necessary.

U.S. Pat. No. 4,671,024

Inventor: Harold W. Schumacher

Issued: Jun. 9, 1987

A drip pan adapted to catch dirt and debris falling from a vehicle that is driven onto it, thereby protecting a garage floor surface underlying the drip pan from soiling or contamination. The drip pan is a rectangular sheet of plastic that is sized to extend beyond the perimeter of the vehicle with which it will be used. The edges of the plastic sheet are rolled under and thermally sealed or glued along a line parallel with the perimeter of the sheet, forming a sleeve. In one embodiment, a radially compressible cylindrical material, such as pipe insulation tubing, is inserted into the sleeves to provide a raised ridge around the perimeter of the sheet. In a second embodiment, the sleeve on each side are hermetically sealed and provided with air inflation valves so they can be inflated to create the ridge. The ridge serves as a side wall to contain the salt, ice, or dirt that falls off the vehicle onto the sheet; a vehicle can be driven over the ridge without damaging it or permanently deforming it. The drip pan is washable and is inexpensive so that it may be discarded and readily replaced when worn.

U.S. Pat. No 4,798,754

Inventor: Lawrence S. Tomek

Issued: Jan. 17, 1989

A lightweight, disposable absorbent mat is adapted for placement beneath a motor vehicle or machine to catch oil, grease and other drippings and comprises a generally rectangular base layer which is made up of an oil-impervious material, and a plurality of upper, oil absorbent piles are interconnected to one another and superimposed on the base layer, the plies being made up of highly absorbent paper or cellulose material. The plies of paper material are interconnected at spaced intervals and may be covered with an upper plastic layer which is perforated to permit any drippings to pass through the upper layer into the absorbent plies, the upper layer having an outer peripheral edge or edges sealed to the outer peripheral edges of the bottom layer to form a moisture barrier around the sides of the absorbent plies; and stiffener frame members may be interposed between the outer peripheral edges of the upper and base layers.

U.S Pat No 5,011,007

Inventor: Barry K. Kenimer

Issued: Apr. 30, 1991

A reservoir- containing garage mat, constructed of a semi-rigid material, into which one or more unfolded sections of standard newspaper are placed as the absorbent material. A meshed cover is placed over the newspaper and is removably attached to the mat to secure the newspaper in place. When placed underneath a motor vehicle, leaking liquid debris such as oil, transmission, hydraulic or radiator fluid, will pass through the mesh thereby making contact with the newspaper. The newspaper is replenished when stained or saturated.

U.S Pat. No. 5,080,956

Inventor: Linda K. B. Smith

Issued: Jan. 14, 1992

The laminated mat of the present invention is suitable for protecting a surface from liquid spills. The mat includes a means for retaining the spills within the laminated mat; a means for channeling the spills throughout laminated mat; and a means for absorbing the channeled spills. The retained means comprises a sheet of nonporous plastic material. The nonporous sheet is preferably a cushioning, bubble-pack of polyethylene and nylon. The channeling means is the bumpy bubble pack surface. The absorbing means comprise an absorbent sheet, which absorbs the liquid spills that are retained on the nonporous sheet. The nonporous sheet is adhered to the absorbent sheet by a heat bonding process, whereby a polytube heat sealer seals the perimeter of the absorbent sheet to the nonporous sheet. The absorbent material may be folded several times, and adhered to itself to form an absorbent roll. The absorbent roll is made from a flexible material which can be readily shaped to surround the base of the leaky machinery to inhibit the flow of oil-based liquid therefrom.

U.S. Pat. No. 5,114,774

Inventor: Henry A. Maxim, Jr.

Issued: May 19, 1992

A floor mat system is disclosed wherein the floor mat is removably attachable to an existing floor, and enables the use of the floor by pedestrians in wet and oily environments. The mat includes a skid-free upper surface bounded by an edging portion either or both of which has self-gripping fastener means attached thereto and a removable portion which is capable of absorbing liquids such as water or oil coming in contact therewith. The removable portion is adapted to be removably attached to the fastener means to provide for removal and cleaning of the removable portion and is positioned below the skid-free upper and edging portion.

U.S. Pat. No. 5,549,945

Inventor: Bruce B. Lind

Issued: Aug. 27, 1996

An improved absorbent mat for absorbing oil and other liquid drippings beneath a motor vehicle, comprising a first bottom impervious flexible layer to be placed upon a support surface beneath a motor vehicle. A second intermediate absorbent flexible layer is disposed upon the first bottom impervious layer. A third top permeable flexible layer is disposed upon the second intermediate absorbent layer.

U.S. Pat. No. 5,916,658

Inventor: Ronald G. Mohr

Issued: Jun. 29, 1999

A new drip catching mat for collecting drips from vehicular fluids and other road debris falling from a vehicle. The inventive device includes a base member for resting on a ground surface with a side wall extended upwardly and inwardly from the upper surface of the base member along the outer perimeter of the base member to together define a reservoir for holding liquids and debris, such as dripping oil and snow melt runoff from a vehicle over the drip catching mat.

U.S. Pat. No. 5,957,241

Inventor: Charlie Roy Anderson

Issued: Sept. 28, 1999

A new oil drip mat apparatus for collecting oil which drips from vehicles and the like. The inventive device includes a base member having a planar bottom mat portion and a beveled rim fastened to the top surface of the mat portion to define a holding area. A plurality of layers of material are disposed within the holding area, with each layer performing a specific function. Two of the layers are a detergent mixture layer for absorbing and breaking down the oil, one of the layers is an animal hair layer for further absorbing oil, and one layer is a porous, stiff fibrous layer which passage of oil therethrough. The outermost layer is a U.V. resistant material which protects the underlying layers from the effects of the sun when the apparatus is used outdoors. If used indoors, the outermost layer is made of a porous, non-slip fabric material.

U.S. Pat. No. 6,062,162

Inventor: Lance Leo Dean

Issued: May 16, 2000

A protective garage mat with integral parking alignment device for protecting a surface from oil spills while concurrently providing vehicle parking assistance. The floor mat includes a reinforced rubber mat having ribs/channels for retaining a pre-determined quantity of oil. The floor mat is formed with a coupling at the fore end for mounting a parking alignment indicator such as an upright pole having a reflector or signal light mounted thereon. The pole is supported in the mat by the coupling for pivotal movement upon being contacted by an advancing vehicle. An optional electrical circuit may electrically actuate a signal light to provide a visible alerting for a driver of the advancing vehicle.

While these fluid absorbing devices may be suitable for the purposes for which they were designed, they would not be as suitable for the purposes of the present invention, as hereinafter described.

SUMMARY OF THE PRESENT INVENTION

The present invention discloses an absorption means of liquid spills and fluids that may leak or fall from underneath the chassis of a motor vehicle. The present invention discloses a main enclosure being a cylindrical-shaped structure having a thin, rectangular aperture therein through which an absorbing element passes. On each end of the main enclosure are retaining cap ends which have retaining grooves therein which provide coupling means for the present invention. A counterweight element is provided in the base of the main enclosure for providing anchorage and stability to the present invention. Rubber feet having threaded members are provided which pass through threaded apertures of the counterweight and provide means for connecting the end caps, counterweights and rubber feet together. The absorbing member is a rectangular-shaped structure comprising a porous material layer, an absorbing material layer and an impermeable material layer. A barrel element or take-up barrel is provided upon which the absorbing element is wound. The barrel element is provided with a spring-loaded ratchet mechanism which provides means for retracting and extending the take-up barrel. A stop having a ring-shaped handle thereon is provided on the distal end of the absorbing element which is used to prevent the absorbing element from being inadvertently retracted into the interior of the main enclosure.

The present invention overcomes the shortcomings of the prior art by providing vehicular fluids containment devices that may prevent inadvertent damage to the ground surface below a vehicle by absorbing the fluids that may leak from the under carriage of a vehicle. Further more to provide a vehicular fluids containment devices that has a retractable and extendable absorbing member.

A primary object of the present invention is to provide vehicular fluids containment devices that may protect driving stalls, drive ways and parking stalls form damage due to vehicular fluid leaks.

Another object of the present invention is to provide a vehicular fluids containment devices that may prevent undesired water contamination due to vehicular fluid leakage into the water and sewer systems via the surrounding ground environment.

Yet another object of the present invention is to provide a vehicular fluids containment devices that is compacted so that it may be stored in a vehicles trunk or any convenient location.

Additional objects of the present invention will appear as the description proceeds.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
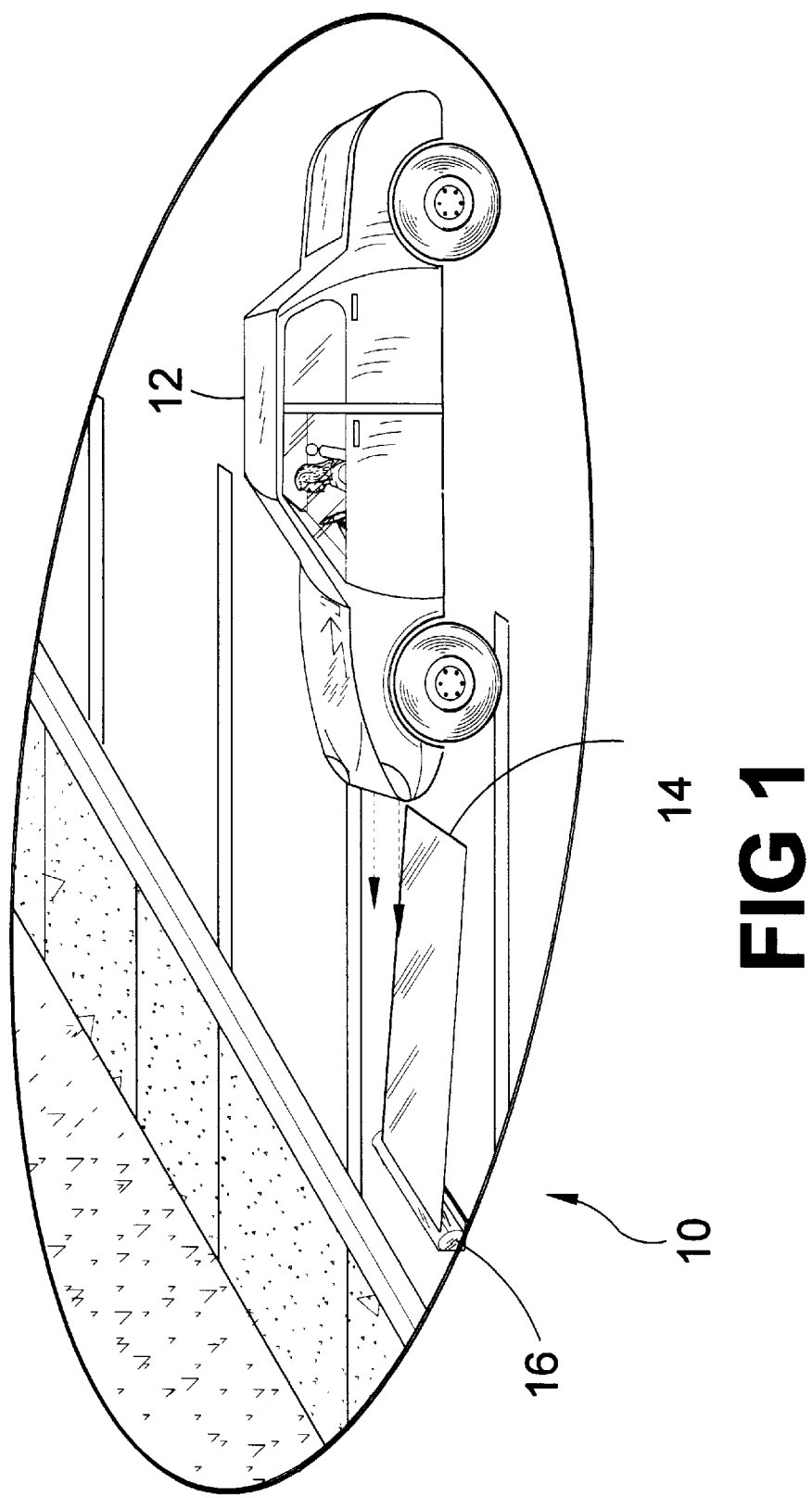
FIG. 1 is a perspective view of the present invention. Shown is a vehicle as it is position over said vehicular fluid absorbent pad. Also shown is the ideal size relations of said vehicular fluid pad as it relates to the size of a vehicle. Shown also is the related convenient of setting up said vehicular fluid absorbent pad for use.

With regard to reference numerals used, the following numbering is used throughout the drawings.

10 present invention
12 vehicle
14 absorbing element
16 main enclosure
18 fluid leak
20 fluid spill
22 rectangular aperture
24 stop
26 handle
28 end cap
30 rubber feet
32 arrows
34 guide baffle
36 counterweight
38 squeegee
40 roller
42 brush
44 take-up barrel
46 spring mechanism
48 threaded member
50 threaded aperture
52 ratchet mechanism
53 grooves
54 sheaf stop
56 thread
58 porous material
60 absorbent material
62 impermeable material
64 retaining bracket

DESCRIPTION OF THE PREFERRED EMBODIMENT(S)

In order that the invention may be more fully understood, it will now be described, by way of example, with reference to the accompanying drawings in which FIGS. 1 through 9 illustrate the present invention being a vehicular fluid absorbent pad.

Turning to FIG. 1, shown therein is a perspective view of the present invention 10. Shown is a vehicle 12 as it is being positioned over the absorbing element 14. Also shown is the ideal size relations of the vehicular fluid pad 14 as it relates to the size of a vehicle 12. Shown also is a related convenient way of setting up the vehicular fluid absorbent pad 14 for use. The main enclosure 16 is also shown.

Figure 2:
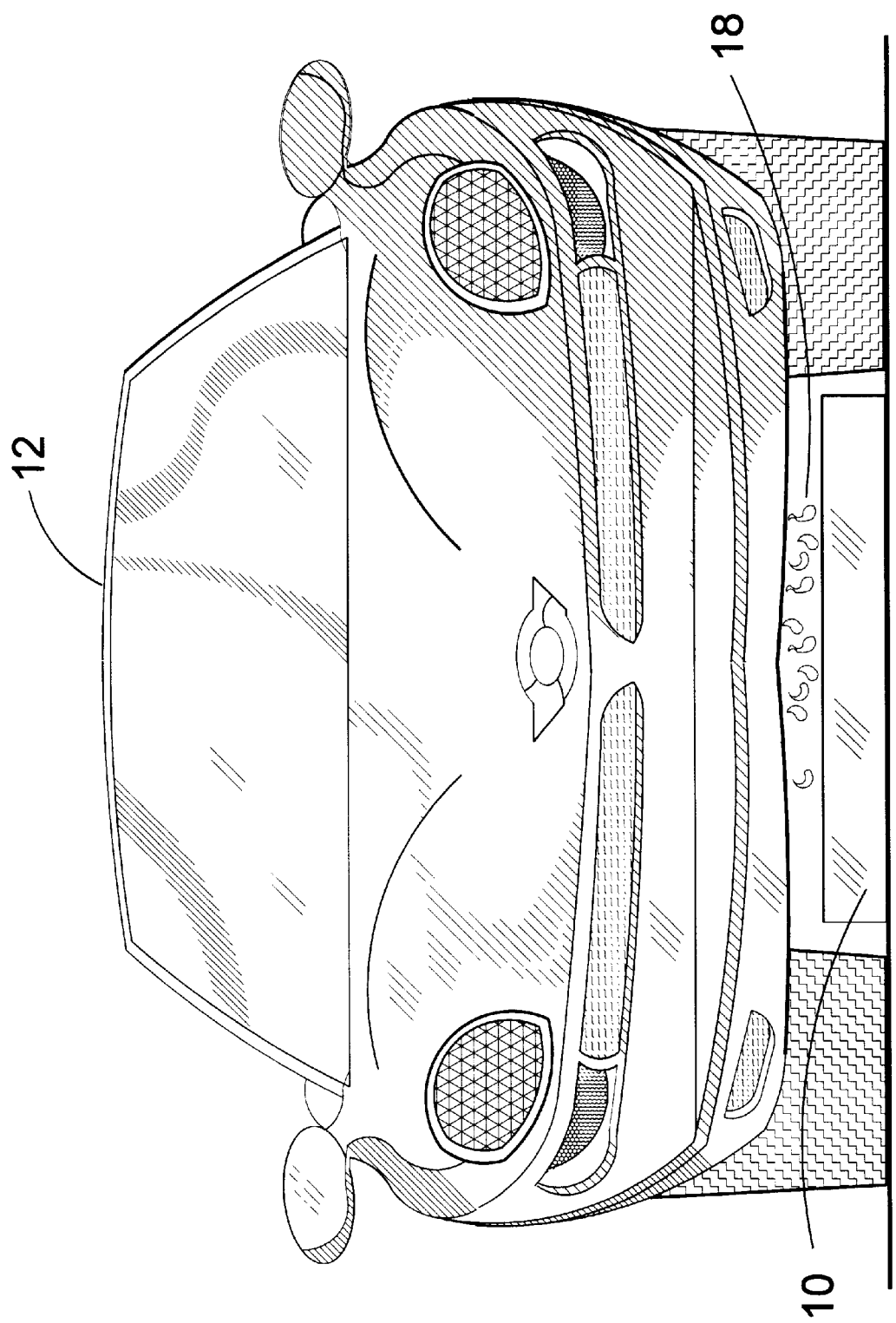
FIG. 2 is a planar view, showing said vehicular fluid absorbent pad positioned underneath a leaking vehicle. Shown also is length and height relations of said vehicular fluid absorbent pad as it relates to the space available between a vehicles wheel span. Also shown is said vehicular fluid absorbent pad as it prevents leaking fluid from a vehicle from inadvertently damaging the surrounding ground environment.

Turning to FIG. 2, shown therein is a planar view, showing the vehicular fluid absorbent pad of the present invention 10 positioned underneath a vehicle leaking fluid 18. Shown also is length and height relations of the vehicular fluid absorbent pad as it relates to the space available between a vehicle wheel span. Also shown is the vehicular fluid absorbent pad of the present invention 10 as it prevents leaking fluid from a vehicle 12 from inadvertently damaging the surrounding ground environment.

Figure 3:
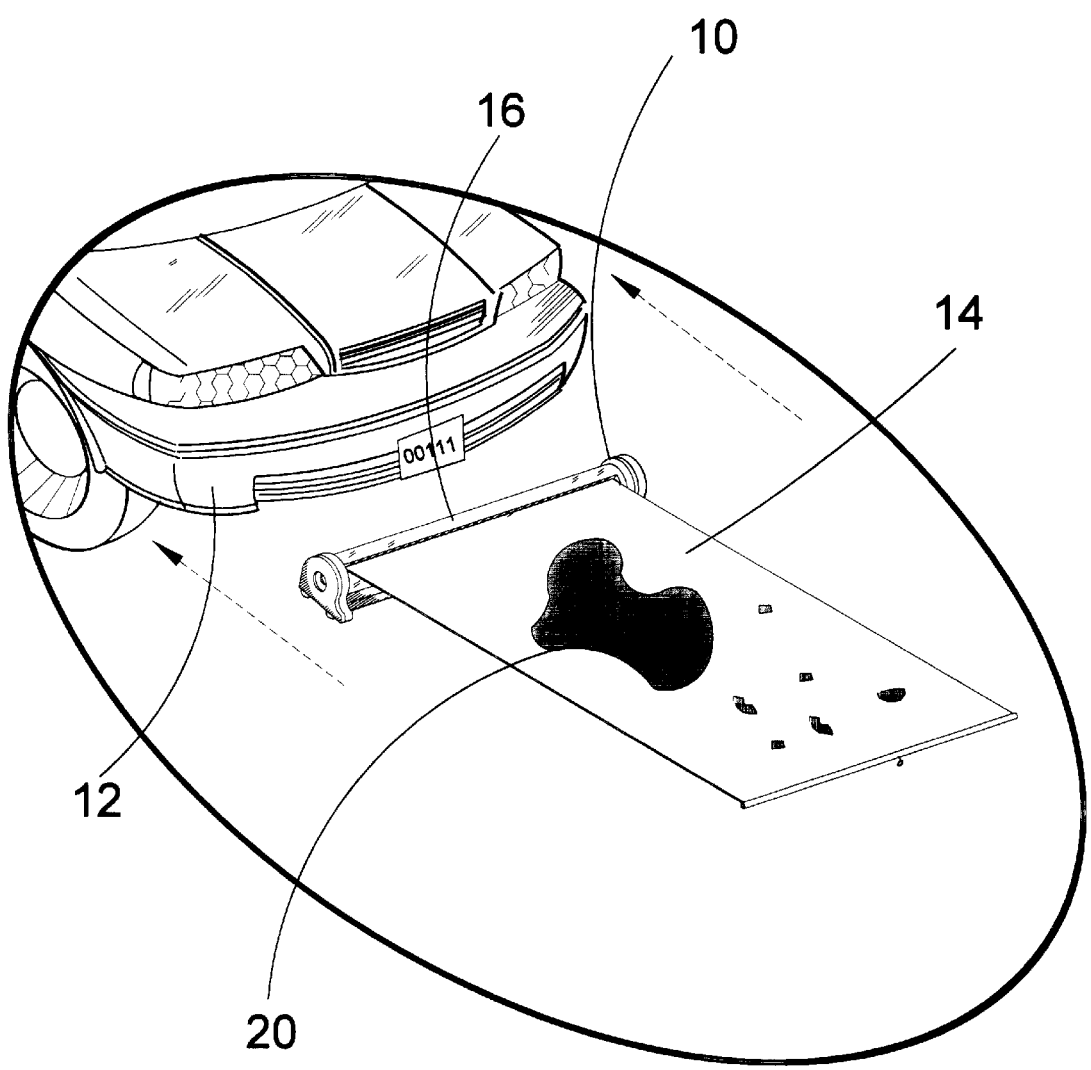
FIG. 3 is a perspective view of the present invention. Shown is a vehicle as it reverses to reveal said vehicular fluid absorbent pad. Also shown is the vehicular fluid absorbent pad as it retains a fluid spill that was emitted from the vehicle. Shown also is the vehicular fluid absorbent pad in it extended position.

Turning to FIG. 3, shown therein is a perspective view of the present invention 10. Shown is a vehicle 12 as it reverses to reveal the vehicular fluid absorbent pad 14. Also shown is the vehicular fluid absorbent pad 14 as it retains a fluid spill 20 that was emitted from the vehicle 12. Shown also is the vehicular fluid absorbent pad 14 in it extended position and main enclosure 16.

Figure 4:
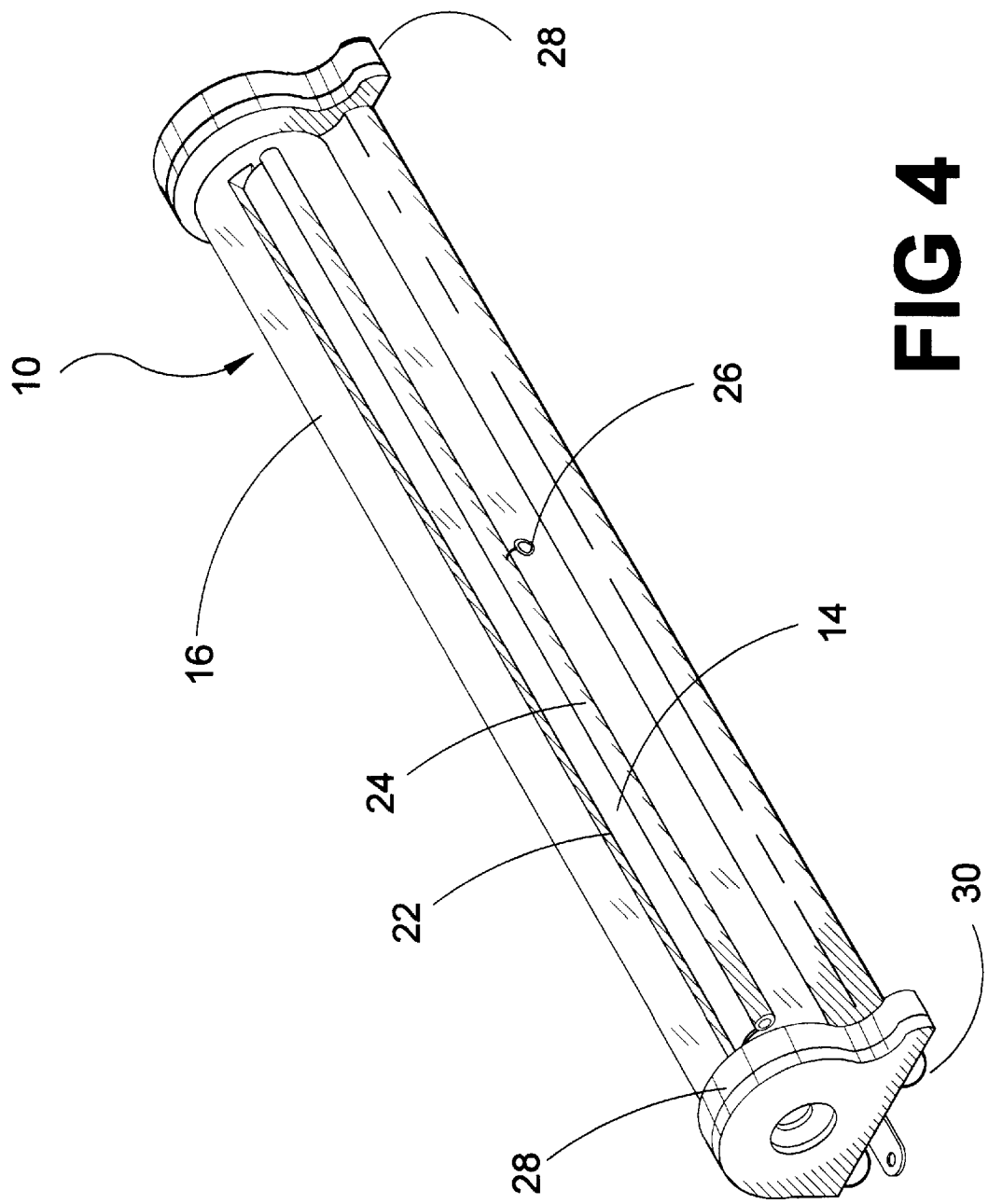
FIG. 4 is perspective view of the present invention. Shown is the displacement relations between several of the intricate components that comprise said vehicular fluid absorbent pad. Also shown is the ideal shape of said vehicular fluid absorbent pad as it seems fit for the performance of its desired function. Shown also is the vehicular fluid absorbent pad with its absorbing element in the retracted position.

Turning to FIG. 4, shown therein is perspective view of the present invention 10. Shown is the displacement relations between several of the intricate components that comprise the vehicular fluid absorbent pad. Also shown is the ideal shape of the vehicular fluid absorbent pad as it seems fit for the performance of its desired function. Shown also is the vehicular fluid absorbent pad with its absorbing element 14 in the retracted position. Also shown is the main enclosure 16 which is a modified, cylindrical-shaped structure having a thin, rectangular aperture 22 horizontally disposed therein through which aperture 22 the absorbing element 14 passes. Also shown is the stop 24 of the absorbing pad element along with a ring-shaped handle 26 which is used to extend the absorbing element 14 from the interior of the main enclosure 16. Also shown on each end of the main enclosure 16 are retaining end caps 28, each having rubber feet 30 disposed on the bottom thereof.

Figure 5:
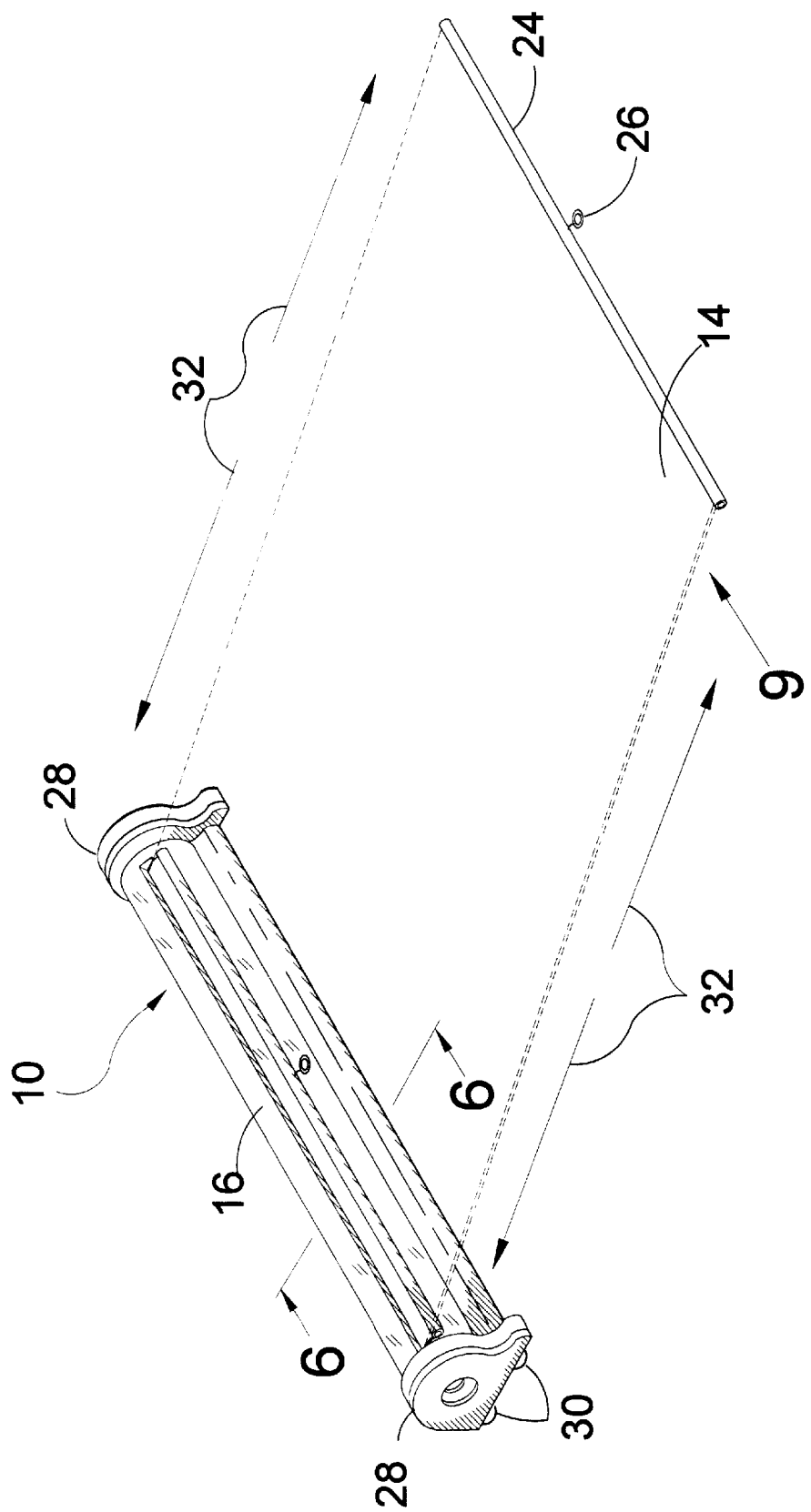
FIG. 5 is perspective view of the present invention. Shown is the vehicular fluid absorbent pad with its absorbing member in phantom lines. Also shown is the absorbing member in the extended position. Shown also is function directions of the absorbing member (represented by arrows).

Turning to FIG. 5, shown therein is perspective view of the present invention 10. Shown is the present invention 10 with its absorbing member 14 in phantom lines. Also shown is the absorbing member 14 in the extended position. Shown also is the function or movable directions of the absorbing member 14 (represented by arrows 32).

Figure 6:
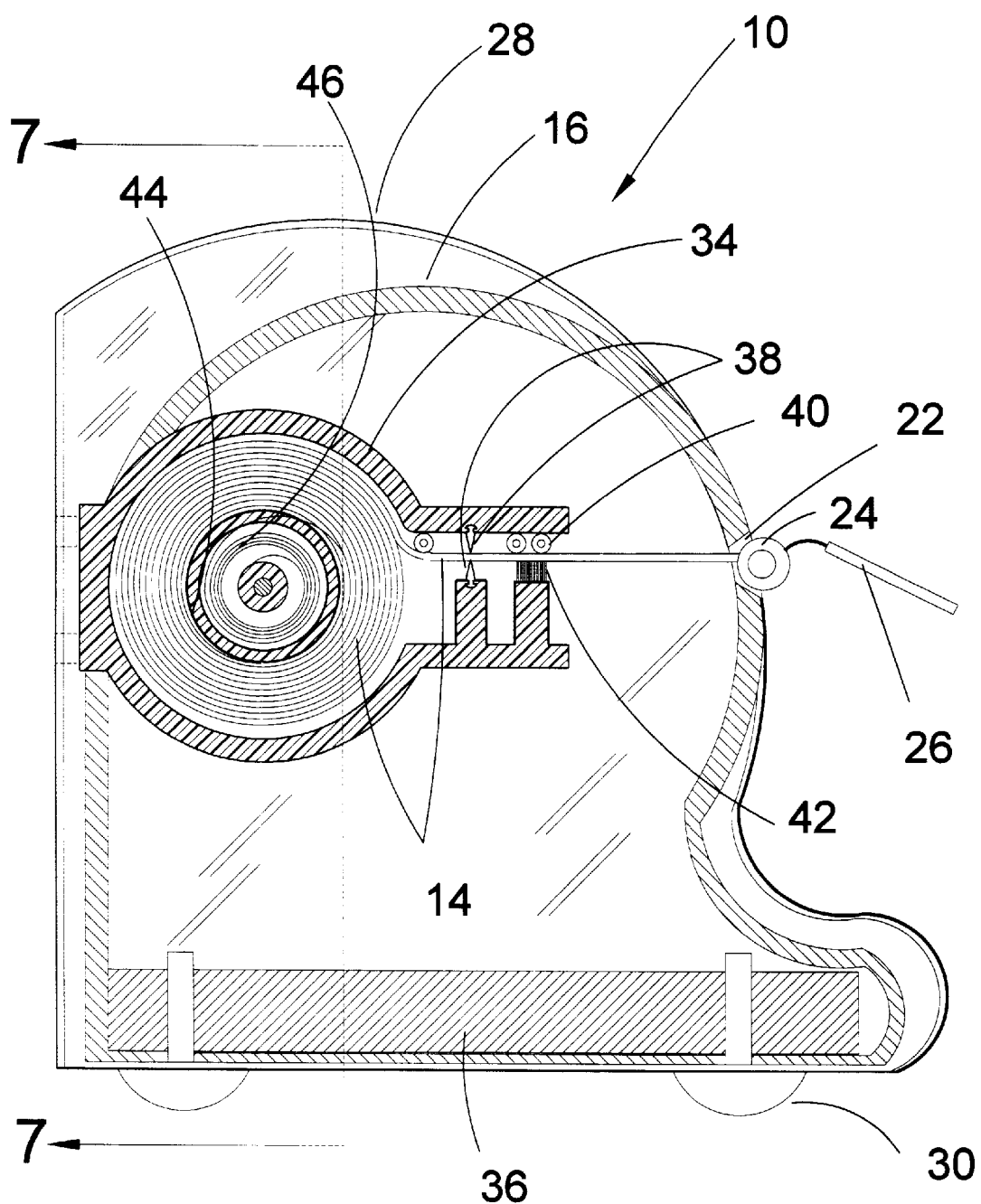
FIG. 6 is sectional view taken from FIG. 5 as indicated. Shown is the displacement relation of the internal intricate components that comprise said vehicular fluid absorbent pad. Also shown is the functional relations of the guide baffle's intricate components as they relate to the absorbing element. Shown also the absorbing element as it protrude through the main enclosure with the stopper attached to one of it distal ends. Also shown is are the rubber feet position at the rear and the front most ends of said vehicular fluid absorbent pad. Shown also is the displacement relations of the main enclosure as it relates to the retaining end cap to provide the housing and containment for the internal intricate components of said vehicular fluid absorbent pad. Also shown is the counter weight element as it is positioned in the main enclosure of said vehicular fluid absorbent pad.

Turning to FIG. 6, shown therein is sectional view taken from FIG. 5 as indicated. Shown are the internal intricate components that comprise the present invention 10. Also shown is the functional relations of the guide baffle's 34 intricate components as they relate to the absorbing element 14. Shown also is the absorbing element 14 as it protrudes through the main enclosure 16 with the stopper 24 attached to one of it distal ends. Also shown are the rubber feet 30 positioned at the rear and the front most ends of the present invention 10. Shown also is the retaining end cap 28 to provide the housing and containment for the internal intricate components of the present invention 10. Also shown is the counterweight element 36 as it is positioned in the main enclosure 16 of the present invention. Also shown is the ring-shaped element or handle 26 of the stop 24 along with the rectangular aperture 22 through which the absorbing element 14 passes. The absorbing element 14 passes through a pair of squeegees 38 designed to remove particles and debris from the absorbing element 14. The absorbing element 14 also passes through a pair of rollers 40 and a brush 42 which is likewise designed to remove particles and debris from the absorbing element 14. A take-up barrel 44 is also shown around which the absorbing element 14 is wound along with means for a spring mechanism 46 which retracts the absorbing element 14.

Figure 7:
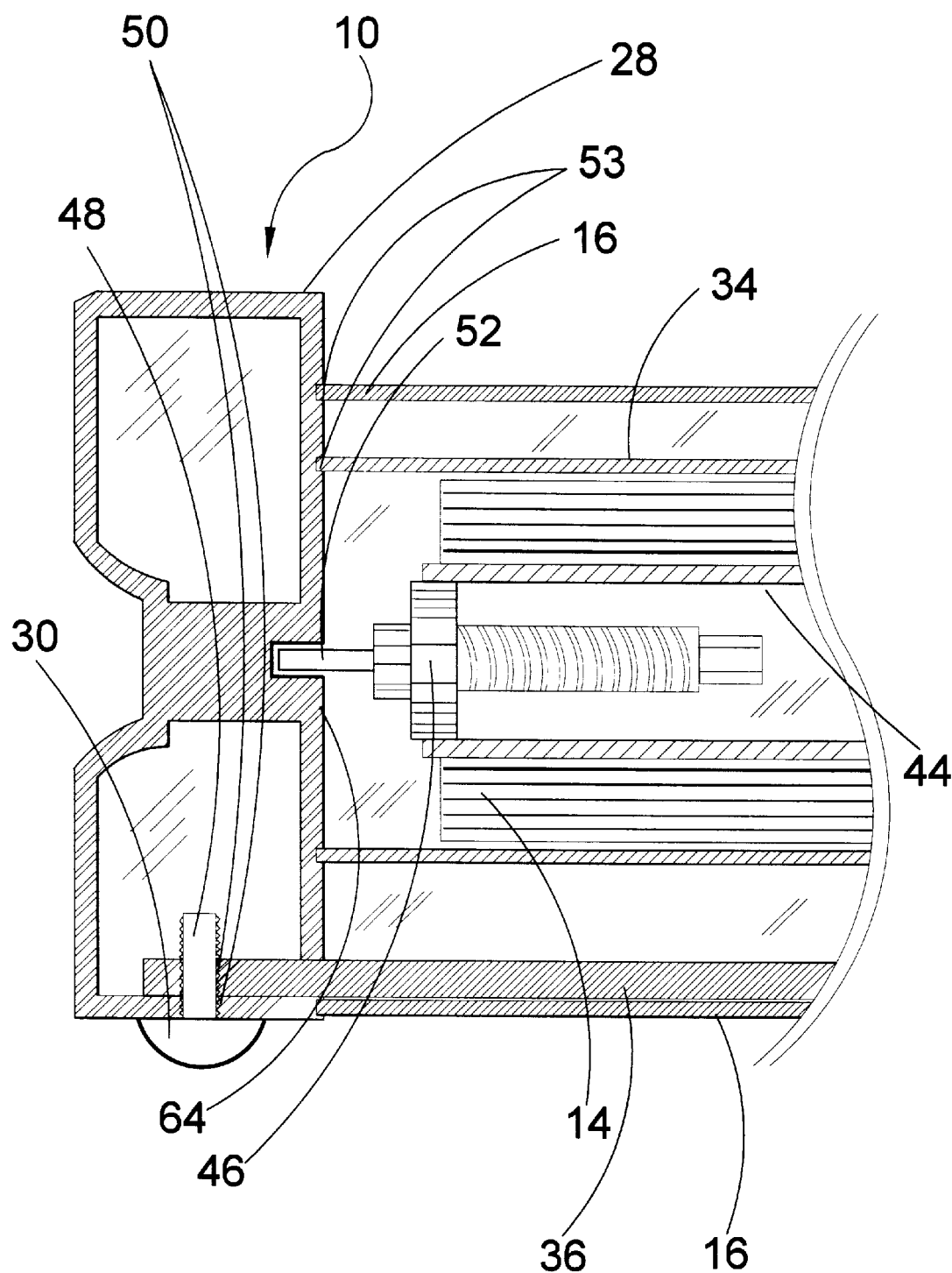
FIG. 7 is sectional view taken from FIG. 6 as indicated. Shown is the linear displacement relations between several of the intricate internal components that comprise said vehicular fluid absorbent pad. Also shown is the coupling relations between the rubber feet and the counterweight element as well as the retaining end caps via the threaded member of the rubber feet and the threaded apertures of the counterweight element and the retaining end cap. Shown also is the spring loaded ratchet mechanism as it relates to the retaining end cap. Also shown is the functional and assembly relations of the spring loaded ratchet mechanism and the barrel element. Shown also is the main enclosure as well as the guide baffle coupled to the retaining end caps via the retaining end caps channel grooves.

Turning to FIG. 7, shown therein is sectional view taken from FIG. 6 as indicated. Shown is the linear displacement relations between several of the intricate internal components that comprise the present invention 10. Also shown is the means for a coupling, being a threaded member 48 and aperture 50, between the rubber feet 30 and the counterweight element 36 as well as the retaining end caps 28 via the threaded member 48 of the rubber feet 30 and the threaded apertures 50 of the counterweight element 36 and the retaining end cap 28. Shown also is the spring loaded ratchet mechanism 52 as it relates to the retaining end cap 28. Also shown is the functional and assembly relations of the spring loaded ratchet mechanism 52 and the barrel element 44. Shown also is the main enclosure 16 as well as the guide baffle 34 coupled to the retaining end caps 28 via the retaining end caps 28 channel grooves 53, the absorbing element 14 and retaining bracket 64.

Figure 8:
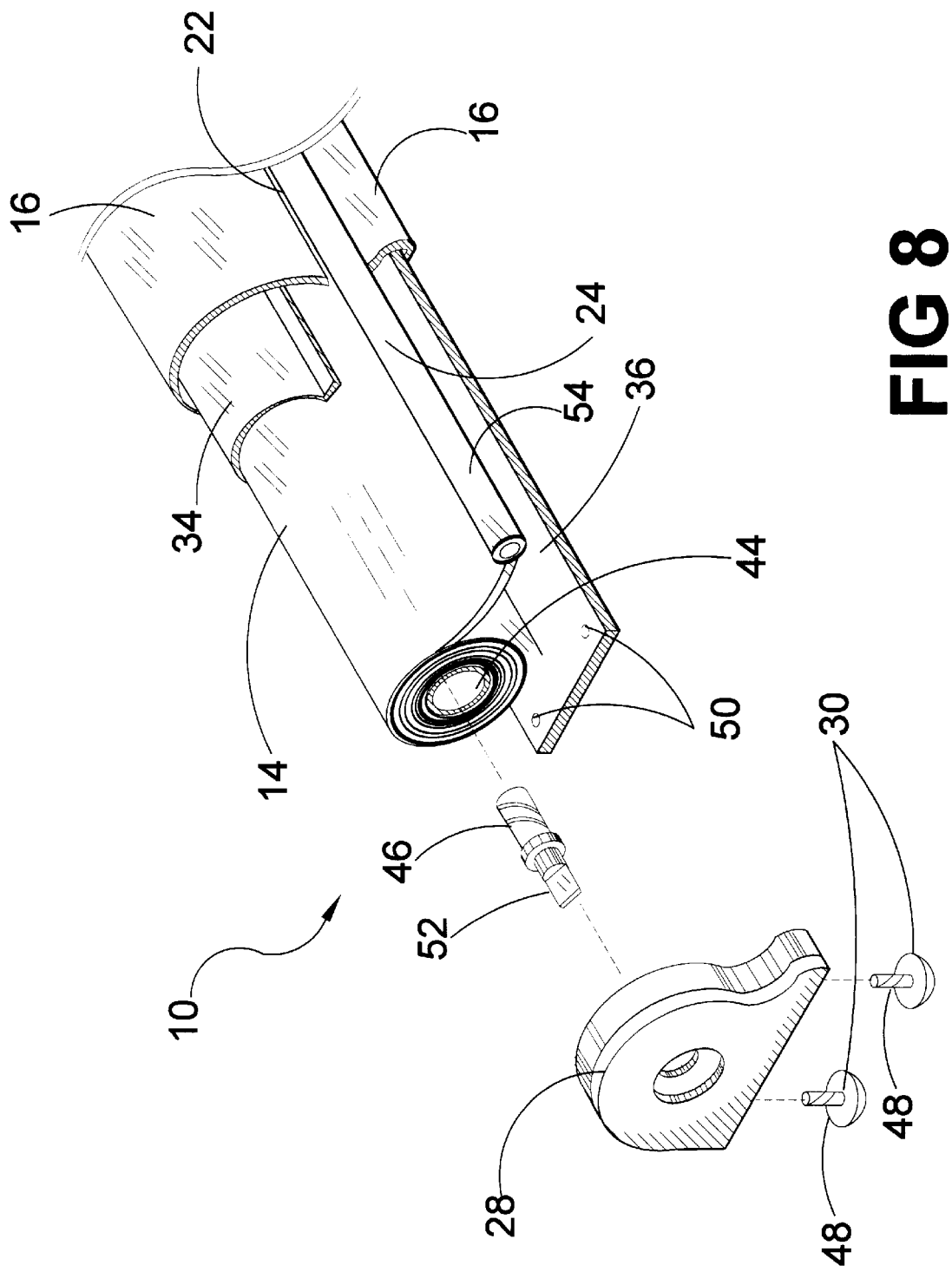
FIG. 8 is an exploded view of the resent invention. Shown is the displacement relations of said vehicular fluid absorbent pads intricate components as they would appear in an assembly print for manufacturing.

Turning to FIG. 8, shown therein is an exploded view of the present invention 10. Shown are the internal components of the present invention 10 as they would appear in an assembly print for manufacturing. Elements previously disclosed are shown. The main enclosure 16 provides means for protection of the internal intricate components from the harsh conditions of the surrounding environment. The retaining end caps 28 are cup-shaped structures having retaining grooves 53 (not shown) therein. The retaining end caps 28 provide means for retaining the internal components within the main enclosure 16 of the present invention 10. The end caps are furnished with a plurality of grooved channels 53 which provide means for coupling the retaining end cap with several of the internal components. The end caps 28 are also furbished with a retaining bracket 64 (not shown) which provides means for coupling the retaining end caps with the ratchet 52 of the spring-loaded ratchet mechanism 46. Also, the retaining end caps 28 assist in providing the absorbing element 14 of the present invention 10 with selectively retracting and extending abilities by working in conjunction with the ratchet member 52 of the spring-loaded ratchet mechanism 46. The end caps are furnished with threaded, circular-shaped apertures at its base 50 to provide means for coupling the retaining end caps with a counterweight element 36 via the threaded member 48 of the rubber feet. The counterweight element 36 is a rectangular-shaped, weighted structure. The counterweight element 36 provides the present invention with a means of anchorage and stability and is located in the main enclosure 16 at the base of the main enclosure. The counterweight element 36 is furnished with threaded apertures 50 at each of its distal ends to provide means for coupling the retaining cap ends 28 with the counterweight element of the present invention by working in conjunction with a threaded member 48 of the rubber feet. The absorbing member 14 is a rectangular-shaped structure comprised a porous sponge-like material. The absorbing member 14 provides the present invention with the means for the absorption of hazardous and other fluids that leak from a vehicle under its carriage or chassis. The absorbing element 14 is coupled to the barrel element 44 at one of its distal ends. Also, the absorbing element is rolled and housed on the take-up barrel 44. The absorbing pad is coupled to a stop 24 at its opposite distal end. The absorbing pad along with the stop 24 protrudes from the thin, rectangular-shaped aperture 22 of the main enclosure 16. The take-up barrel 44 provides housing for the absorbing pad 14 and is coupled to the spring-loaded ratchet mechanism 52 and works in conjunction with the spring-loaded ratchet mechanism 46 to provide means for extending and retracting the absorbing element 14. The spring-loaded ratchet mechanism 46 provides means for retracting and extending the absorbing pad and works in conjunction with the retaining end caps 28 and its retaining bracket as well as the barrel element. The spring-loaded ratchet mechanism 46 is activated when the absorbing element 14 is pulled on to be extended or pulled on to initiate the ratchet mechanism's retractable ability. The spring-loaded ratchet mechanism 46 resembles and functions as spring-loaded ratchet mechanisms that are commonly found in conventional window shades. The rubber feet 30 have threaded, extended members 48 providing the present invention with traction and stability and are positioned one on each of the four threaded apertures 50 located at each of the corners of the base of the main enclosure 16 on the underside of the retaining end caps 28. The stop 24 is a cylindrical-shaped structure that is coupled to the other distal end of the absorbing element and provides means for preventing the absorbing element 14 from inadvertently being totally retracted into the interior of the main enclosure 16. The stop 24 also has a ring-shaped, sheaf-like structure 54 thereon which provides means for placing the absorbing element in a stationary position when extended from the main enclosure of the present invention.

Figure 9:
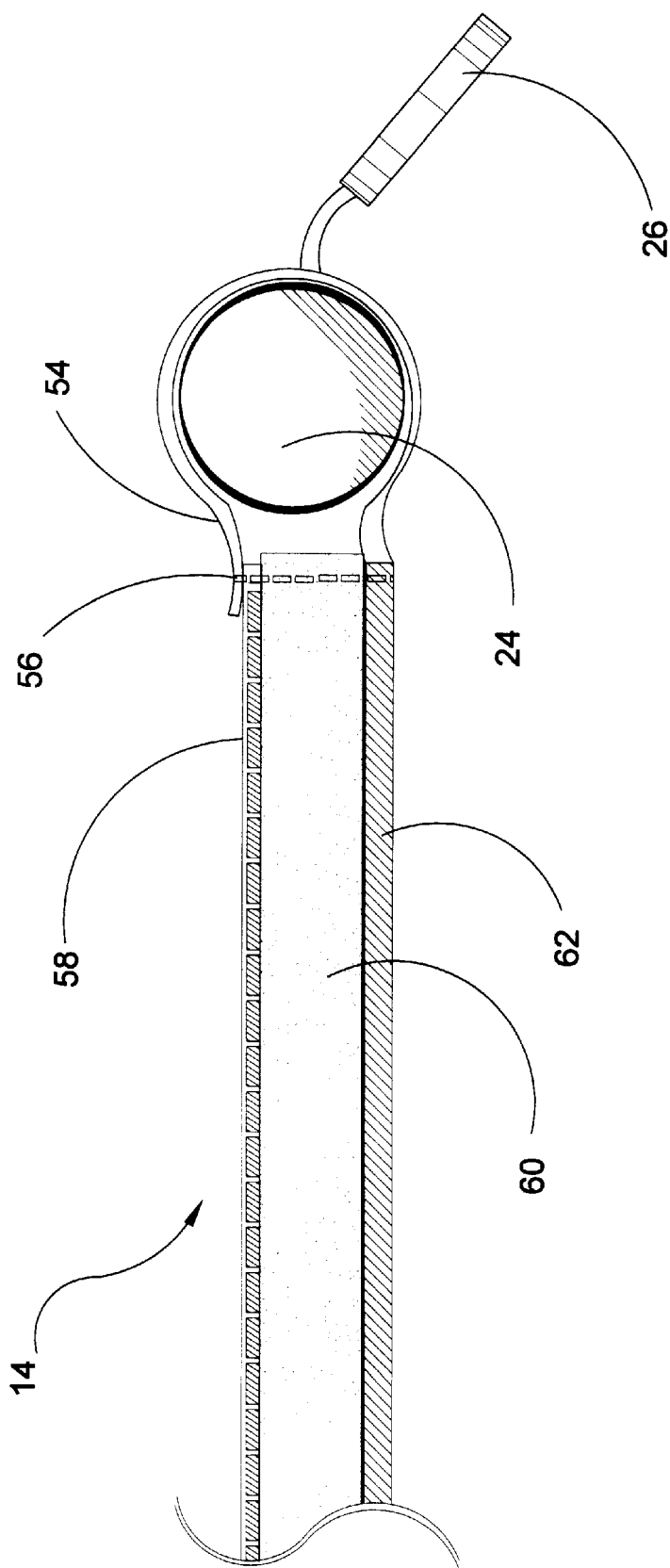
FIG. 9 is a side view, shown the material composition of the absorbent element of the vehicular fluid absorbent pad. Also shown is the linear displacement relations of the materials that compose the absorbent element as they relate to each other. Shown is the stopper sheaf as it works in conjunction a sewn in thread retainer to assists in providing the material restraining means for the absorbent element.

Turning to FIG. 9, shown therein is a side view, showing the material composition of the absorbent element 14 of the present invention. Also shown is the linear displacement relations of the materials that compose the absorbent element 14 as they relate to each other. Shown is the stopper sheaf 54 of stop 24 as it works in conjunction with a sewn-in thread 58 retainer to assist in providing the material restraining means for the absorbent element 14. The stop handle 26 is shown along with a porous material layer 58, an absorbent material layer 60 and an impermeable material layer 62.

What is claimed to be new and desired to be protected by Letters Patent is set forth in the appended claims.

I claim:

1. An apparatus for placement underneath a vehicle for absorbing fluid leaks and spills therefrom, comprising:
   a) an absorbing element, said absorbing element being rectangular shaped, having a first end, a second end, a top side, and a bottom side;
   b) a housing for storing said absorbing element therein, said housing being an elongated cylindrical structure, said housing have a thin, rectangular elongated aperture disposed horizontally therein, said absorbing element passing through said aperture, said housing having a bottom side;
   c) a take-up barrel disposed internal said housing upon which barrel said absorbing element is wound, said first end of said absorbing element connected to said barrel;
   d) a guide baffle disposed internal said housing, said baffle being complimentarily shaped as said housing for guiding said absorbing element onto said take-up barrel, said guide baffle having an entrance therein through which said absorbing member passes;
   e) a stop is provided on said second end of said absorbing element to prevent retraction into said housing;
   f) means for a spring-loaded ratchet mechanism disposed on said take-up barrel whereby said take-up barrel selectively rotates to retract or extend said absorbing element;
   g) a counterweight disposed in said bottom of said housing to provide stability to the housing;
   h) means for a pair of retaining end caps, whereby said housing, said take-up barrel, said guide baffle, said means for a spring-loaded ratchet mechanism and said counterweight are retained in a cooperating relationship, said means for end caps being complimentarily shaped as said housing, said end caps having a bottom.

2. The apparatus of claim 1, said absorbing element further comprising a porous layer disposed on said top side thereof, an impermeable layer disposed on said bottom side, and an absorbing layer disposed between said porous layer and said impermeable layer.

3. The apparatus of claim 1, further comprising a sheaf for encasement of said stop, said sheaf complimentarily shaped as said stop.

4. The apparatus of claim 3, further comprising a ring-like handle disposed on said sheaf said handle for being gripped by a user.

5. The apparatus of claim 4, wherein said sheaf is connected to said absorbing element using thread.

6. The apparatus of claim 5, wherein said stop has a diameter slightly greater than the width of said aperture so that said stop cannot pass through said aperture.

7. The apparatus of claim 1, said counterweight having a plurality of threaded apertures therein, said apertures disposed in the corners thereof, further said bottom of said end caps having multiple threaded apertures therein, said apertures disposed in operative alignment with each other.

8. The apparatus of claim 7, further comprising multiple rubber feet disposed on said bottom of said end cap, said feet having a threaded member thereon for connection to said end caps.

9. The apparatus of claim 8, wherein said threaded member is threadably disposed in said threaded apertures of said end caps and said threaded apertures of said counterweight for connecting said rubber feet, said end caps and said counterweight together.

10. The apparatus of claim 1, wherein said spring-loaded ratchet mechanism operates selectively to retract or extend said absorbing member in response to a pull on said absorbing member by a user.

11. The apparatus of claim 1, wherein said means for a pair of retaining end caps further comprise an inner face, said inner face of said pair of caps having a plurality of concentrically disposed grooves therein, said grooves for fixedly retaining said housing ends and said guide baffle ends.

12. The apparatus of claim 11, wherein said inner face of said pair of retaining end caps further comprise a centrally disposed means for a retaining bracket whereby said retaining bracket rotatably receives said spring-loaded ratchet mechanism.

13. The apparatus of claim 12, farther comprising said spring-loaded ratchet mechanism having a first ratchet end and a second spring-loaded end.

14. The apparatus of claim 13, said inner face of said pair of retaining end caps having a centrally disposed recess therein.

15. The apparatus of claim 14, said centrally disposed recess for receiving said first ratchet end of said spring-loaded ratchet mechanism.

16. The apparatus of claim 15, said take-up barrel receiving said second spring-loaded end of said spring-loaded ratchet mechanism whereby said take-up barrel is rotatably connected to said pair of retaining end caps.

17. The apparatus of claim 1, further comprising means for a squeegee disposed on said guide baffle entrance whereby said absorbing member is dried.

18. The apparatus of claim 1, further comprising means for brushing disposed on said guide baffle entrance whereby said absorbing member is cleaned.

19. The apparatus of claim 1, further comprising means for rolling disposed on said guide baffle entrance whereby wrinkles are removed from said absorbing member.

* * * * *